United States Patent
Soga

(10) Patent No.: US 7,961,229 B2
(45) Date of Patent: Jun. 14, 2011

(54) IMAGE PICKUP APPARATUS AND METHOD USING VISIBLE LIGHT AND INFRARED

(75) Inventor: Takashi Soga, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 528 days.

(21) Appl. No.: 12/058,717

(22) Filed: Mar. 30, 2008

(65) Prior Publication Data

US 2008/0239091 A1    Oct. 2, 2008

(30) Foreign Application Priority Data

Mar. 30, 2007 (JP) ................................. 2007-092648

(51) Int. Cl.
*H04N 9/68* (2006.01)
(52) U.S. Cl. ................. 348/236; 348/252; 348/336
(58) Field of Classification Search ............... 348/218.1, 348/222.1, 236, 336, 342, 252
See application file for complete search history.

(56) References Cited

U.S. PATENT DOCUMENTS

| | | | |
|---|---|---|---|
| 4,967,276 | A | 10/1990 | Murakami et al. |
| 7,531,781 | B2 * | 5/2009 | Sumi et al. ............... 250/208.1 |
| 2002/0030163 | A1 * | 3/2002 | Zhang ............................ 250/330 |
| 2005/0200760 | A1 * | 9/2005 | Nakakuki ..................... 348/623 |
| 2006/0132642 | A1 * | 6/2006 | Hosaka et al. ............... 348/370 |
| 2006/0268110 | A1 * | 11/2006 | Koike et al. .................. 348/159 |
| 2009/0065695 | A1 * | 3/2009 | DeMarco et al. ............. 250/330 |

FOREIGN PATENT DOCUMENTS

| | | |
|---|---|---|
| JP | 63-298127 | 12/1988 |
| JP | 01-296785 | 11/1989 |
| JP | 03-021937 A | 1/1991 |
| JP | 11-073491 A | 3/1999 |
| JP | 2000-019259 A | 1/2000 |
| JP | 2006-180269 A | 7/2006 |

OTHER PUBLICATIONS

Notification of Reasons for Refusal, dated Jan. 27, 2011, issued in corresponding JP Application No. 2007-092648, 4 pages in English and Japanese.

* cited by examiner

*Primary Examiner* — Gevell Selby
(74) *Attorney, Agent, or Firm* — Sughrue Mion, PLLC

(57) ABSTRACT

A digital still camera includes a lens system. A cold mirror separates object light incident on the lens system into a visible light component and an infrared component. A visible light image sensor outputs a first image signal of a visible light image by receiving the visible light component. An infrared light image sensor outputs a second image signal of an infrared image by receiving the infrared component. A contour signal generator extracts a high frequency component from a luminance signal determined according to the second image signal, to produce an edge enhancement signal. An adder adds the edge enhancement signal to a luminance signal determined according to the first image signal. Addition of the edge enhancement signal is adapted to the object light from an object at a far distance. Specifically, the cold mirror reflects the visible light component and transmits the infrared component.

9 Claims, 2 Drawing Sheets

IMAGE PICKUP APPARATUS AND METHOD USING VISIBLE LIGHT AND INFRARED

BACKGROUND OF THE INVENTION

1. Field of the Invention

The present invention relates to an image pickup apparatus and method. More particularly, the present invention relates to an image pickup apparatus and method in which a full-color image of an object at a far distance can be photographed sharply with reliability.

2. Description Related to the Prior Art

An image sensor in a digital still camera as well as human eyes detects a shape or color of an object by receiving light reflected by the object. If the object is located at a far distance, the reflected light from the object is likely to scatter because of passage through air in a large space. Although visible light with a long wavelength (for example, color light of red or yellow) is likely to travel straight without scatter, the visible light with a short wavelength (for example, blue light) is likely to scatter. A landscape of a far distance is likely to look with blur because of bluish scattered light. It has been technically difficult sharply to form an image of a far distance.

It is known in a near infrared camera that a sharp image without blur can be obtained even at a far distance, because scatter of infrared rays is smaller than the visible light in the condition of vapor in the atmosphere. However, there is a shortcoming in that only a monochromatic image can be obtained. No full-color image is obtained.

There is an infrared camera for detecting thermal infrared rays emitted by an object, so as to measure distribution of temperature. An image recorded by the infrared camera is characterized in that it is difficult to grasp a shape of an object unlike a visible image. Discernment of a target portion of the object is difficult. Certain documents disclose a structure in which the is combined with a visible light camera. JP-A 63-298127 discloses a type of the infrared camera in which a single display panel is changed over to display the visible image and a thermal infrared image. U.S. Pat. No. 4,967,276 (corresponding to JP-A 1-296785) discloses a video signal mixing apparatus in which a black level of a video signal of the infrared rays output by the infrared camera is detected, and the video signal of the visible light is derived according to the black level from the video signal of visible light output by the visible light camera, so that the video signal is combined with a portion of the black level.

In JP-A 63-298127 and U.S. Pat. No. 4,967,276 (corresponding to JP-A 1-296785), the visible image is mixed with or combined with the thermal infrared image for the purpose of facilitating recognition of the thermal infrared image. However, the construction of the documents is not usable for images in the field of photograph, because images of the documents are thermal images obtained by infrared thermography in which the color is different from that of normal visible images.

SUMMARY OF THE INVENTION

In view of the foregoing problems, an object of the present invention is to provide an image pickup apparatus and method in which a full-color image of an object at a far distance can be photographed sharply with reliability.

In order to achieve the above and other objects and advantages of this invention, an image pickup apparatus includes a lens system. An optical separator separates object light passed through the lens system into a visible light component and an infrared component. A visible light image sensor outputs a first image signal of a visible light image by receiving the visible light component. An infrared light image sensor outputs a second image signal of an infrared image by receiving the infrared component. A contour signal generator produces an edge enhancement signal from a high frequency component according to the second image signal. An adder adds the edge enhancement signal to a luminance signal determined according to the first image signal for edge enhancement.

The optical separator is a cold mirror for reflecting the visible light component and transmitting the infrared component.

The edge enhancement is carried out while the lens system is focused at infinity.

A path length from the optical separator to the infrared image sensor is set greater than a path length from the optical separator to the visible light image sensor, to compensate for a difference in an in-focus position due to a difference between wavelengths in the object light.

Furthermore, a mode selector sets a selected one of an edge enhancement mode and a normal photographing mode. The edge enhancement is carried out when the edge enhancement mode is set, and is not carried out when the normal photographing mode is set.

Furthermore, a controller corrects an exposure amount of the visible light image pickup unit or the infrared image pickup unit so as to compensate for shortage in an exposure amount of the infrared image pickup unit in comparison with the visible light image pickup unit.

Furthermore, a lens moving device moves the lens system for focus adjustment. The mode selector sets the edge enhancement mode when the lens system is set for the object at the far distance, and sets the normal photographing mode when the lens system is set for an object at a distance smaller than the far distance.

The controller sets exposure time of the infrared image pickup unit longer than exposure time of the visible light image pickup unit.

Each of the visible light image pickup unit and the infrared image pickup unit includes the image sensor. A mechanical shutter is disposed in front of the image sensor. The controller obtains object brightness information according to an output of the image sensor, and controls the mechanical shutter of the visible light image pickup unit or the infrared image pickup unit according to the object brightness information.

The mechanical shutter of the infrared image pickup unit becomes open earlier or becomes closed later than the mechanical shutter of the visible light image pickup unit.

The mechanical shutter of the visible light image pickup unit is opened and closed for plural times while the mechanical shutter of the infrared image pickup unit is open.

In a preferred embodiment, an image pickup method is provided, and includes separating object light incident on a lens system into a visible light component and an infrared component. A first image signal of a visible light image is outputted by receiving the visible light component on a visible light image pickup unit. In synchronism with reception of the visible light component, a second image signal of an infrared image is outputted by receiving the infrared component on an infrared light image pickup unit. A high frequency component is extracted from a luminance signal determined according to the second image signal, to produce an edge enhancement signal. The edge enhancement signal is added to a luminance signal determined according to the first image signal.

Furthermore, an exposure amount of the visible light image pickup unit or the infrared image pickup unit is corrected so as to compensate for shortage in an exposure amount of the infrared image pickup unit in comparison with the visible light image pickup unit.

Consequently, a full-color image of an object at a far distance can be photographed sharply with reliability, because an edge enhancement signal is obtained by utilizing infrared image pickup, and additionally used with a visible light component.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
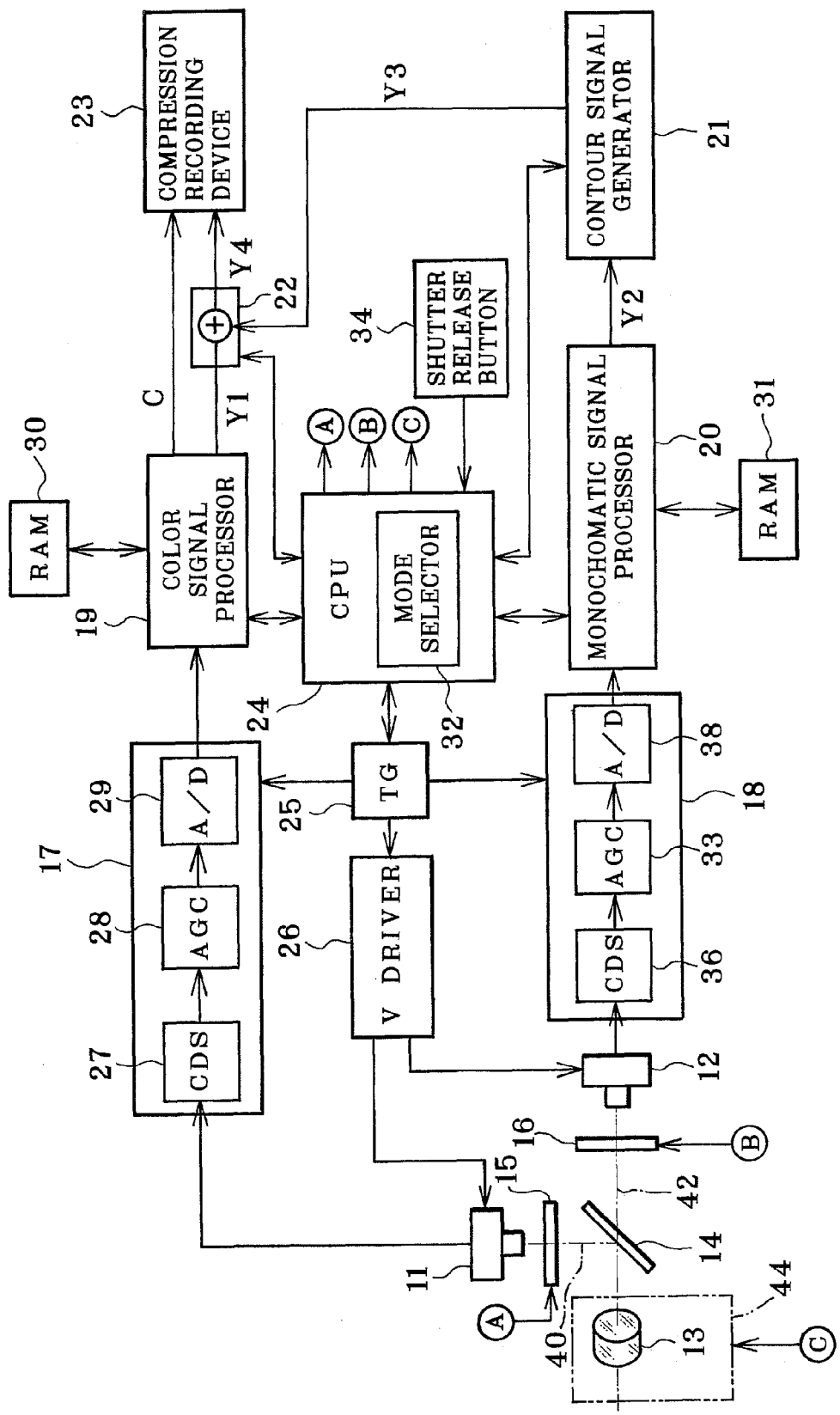
FIG. 1 is a block diagram illustrating a digital still camera.

In FIG. 1, a digital still camera 10 as an image pickup apparatus includes an autofocus device, a visible light image sensor 11 in an image pickup unit, and an infrared image sensor 12 in an image pickup unit. The visible light image sensor 11 picks up an image of visible light. The infrared image sensor 12 picks up an image of infrared rays. If an object distance of an object is not infinity, then the visible light image sensor 11 operates to generate a luminance signal Y and a chrominance signal C, which are combined as image data.

If the distance of the object distance information is infinity, then the visible light image sensor 11 and the infrared image sensor 12 are driven in synchronism. An edge enhancement signal is obtained by extraction from a luminance signal Y determined according to a monochromatic image signal obtained by the infrared image sensor 12. The edge enhancement signal is added to the luminance signal Y determined according to a color image signal obtained from the visible light image sensor 11, to acquire image data as a combination of the modified luminance signal after the addition and a chrominance signal.

In FIG. 1, the digital still camera 10 has the visible light image sensor 11 and the infrared image sensor 12, and also a lens system 13, a cold mirror 14 as optical separator, a first mechanical shutter 15, a second mechanical shutter 16, AFEs (analog front ends) 17 and 18, a digital color signal processor 19, a digital monochromatic signal processor 20, a contour signal generator 21, an adder 22, a compression recording device 23, a CPU 24, a timing generator (TG) 25, a V driver 26 and a shutter release button 34. A lens moving device in a lens unit 44 mechanically moves the lens system 13 for the autofocus control. Other elements in the digital still camera 10, such as a power source unit, are not illustrated in FIG. 1.

The cold mirror 14 for optical separation is disposed behind the lens system 13 and positioned to set its reflection center on an optical axis. A visible light component 40 of object light is reflected by the cold mirror 14. An infrared component 42 is transmitted through the cold mirror 14. The visible light image sensor 11 is sensitive in a visible light region of the wavelength. A reception surface of the visible light image sensor 11 is disposed in the focal plane of the lens system 13. The visible light image sensor 11 picks up an image of the visible light component 40 reflected by the cold mirror 14, and outputs a color image signal of the visible light region. Examples of the visible light image sensor 11 are a CCD, CMOS sensor and the like provided with a color filter.

The infrared image sensor 12 has sensitivity in the near infrared region, and outputs a monochromatic image signal by picking up an image of the infrared component 42 passed through the cold mirror 14. The type of the infrared image sensor 12 is the same as the visible light image sensor 11 in relation to the number of the effective pixels, scanning system, synchronization system and the like.

The focal length of the optics is slightly greater in passage of infrared rays than in passage of the visible light, because a refractive index of the infrared rays relative to a lens is smaller than that of the visible light. Thus, a path length of the optical path from the cold mirror 14 to a reception surface of the infrared image sensor 12 is set greater than a path length of the optical path from the cold mirror 14 to a reception surface of the visible light image sensor 11.

Note that a hot mirror may be used instead of the cold mirror 14. However, an image is produced mainly according to a component of a color image signal by picking up an image of the visible light component 40. If the hot mirror is used, visible light is obtained by transmission. When the cold mirror 14 is used, visible light is obtained by reflection. Therefore, the cold mirror 14 is effectively used as degradation of the image is smaller in consideration of separation of a wavelength.

The AFE 17 includes a CDS (correlated double sampling) circuit 27, an AGC (automatic gain control) circuit 28, and an A/D converter 29. An image signal obtained by the visible light image sensor 11 is digitally converted by the AFE 17 and is sent to the color signal processor 19, which produces a luminance signal Y1 and chrominance signal C. The compression recording device 23 is supplied with the luminance signal Y1 and chrominance signal C, which are encoded in a predetermined compression format, and is written to a memory as a single data file. The AGC circuit 28 is adjustable for the gain, which is determined by the CPU 24. The timing generator 25 supplies the AFE 17 and the V driver 26 with pulses for synchronism.

After the exposure, the first mechanical shutter 15 for the color image is closed. Image data output by the AFE 17 is processed by the color signal processor 19 and written to RAM 30 temporarily. At the same time, information of color temperature, object brightness and object distance is sent to the CPU 24 by an AWB (auto white balance) circuit and AE/AF evaluator in the color signal processor 19. The CPU 24 is responsive to the information, and controls the image processing, the focus adjustment of the lens system 13, the aperture stop and exposure time of the first mechanical shutter 15, the gain adjustment of the AGC circuit 28, and an electronic shutter of the visible light image sensor 11.

The color signal processor 19 writes image data of one frame to the RAM 30, and then reads the image data for image processing. An Y/C separator in the color signal processor 19 converts the processed image data into data of a luminance signal Y1 and data of a chrominance signal C for color.

A monochromatic image signal output by the infrared image sensor 12 is digitally converted by the AFE 18. A RAM 31 in the monochromatic signal processor 20 stores the image signal in a temporary manner. The AFE 18 includes a CDS (correlated double sampling) circuit 36, an AGC (automatic gain control) circuit 33, and an A/D converter 38. The AFE 18 and the monochromatic signal processor 20 for monochromatic image pickup are elements distinct from those for the color image pickup. After the monochromatic signal processor 20 writes image data of one frame to the RAM 31, the monochromatic signal processor 20 reads the image data from the same and processes the image data in the image processing. After this, a luminance signal Y2 is sent to the contour signal generator 21. The infrared image sensor 12 and the AFE 18 are driven in synchronism by means of the timing generator 25 and the V driver 26 for the color image pickup. The second mechanical shutter 16 for the infrared component 42 is controlled in synchronism with the first mechanical shutter 15 for the visible light component 40 by the CPU 24 to set an equal aperture stop value and exposure time.

The contour signal generator 21 is a band-pass filter (BPF), extracts a high frequency component from the luminance signal Y2 generated by the monochromatic signal processor 20. The high frequency component is an edge enhancement signal Y3 which is sent to the adder 22. The adder 22 receives the edge enhancement signal Y3 and the luminance signal Y1 of the color image signal in synchronism, adds the edge enhancement signal Y3 to the luminance signal Y1 to obtain a modified luminance signal Y4. The compression recording device 23 is supplied with the modified luminance signal Y4.

The shutter release button 34 is connected with the CPU 24. Various elements in the camera are controlled by the CPU 24. In response to the halfway depression of the shutter release button 34, the CPU 24 retrieves information of an object distance from the color signal processor 19.

An internal mode selector 32 is incorporated in the CPU 24. If the distance of the object distance information is not infinity, then the mode selector 32 selects the use of only the data of the image signal of the visible light component 40. The chrominance signal C and luminance signal Y1 are used as image data according to image pickup. If the distance of the object distance information is infinity, then the mode selector 32 selects the use of image data including the chrominance signal C and modified luminance signal Y4.

When the distance of the object distance information is infinity, a monochromatic image signal of light of an infrared region is retrieved. A high frequency component is derived from the luminance signal Y2 of the monochromatic image signal. A high frequency component signal Y3 is added to the luminance signal Y1 of the color image signal. Thus, it is possible to record a far distance image in which a contour of an image of the visible light component 40 can be sharp with enhanced edges of mountains, clouds or other scenery objects without appearance of blur.

Note that a delay in the phase is likely to occur in the luminance signal according to the monochromatic image pickup in comparison with the color image pickup, because of time required for processing of the contour signal generator 21. To solve such a problem, it is preferable to connect a delay circuit (not shown) to the output terminal of the color signal processor 19, to synchronize the input of the luminance signals Y1 and Y3 to the adder 22. In addition, a delay is likely to occur in the input of the chrominance signal C and modified luminance signal Y4 to the compression recording device 23. To solve such a problem, it is preferable to connect a delay circuit (not shown) to an input terminal of the compression recording device 23, to synchronize the input of the chrominance signal C and modified luminance signal Y4.

Also, chrominance signal C and the luminance signal Y1 or modified luminance signal Y4 are sent to a video memory (not shown) in the same manner as the compression recording device 23. Data is developed in the video memory. Image data read from the video memory is sent to a video driver, to display a live image on an LCD panel or the like on the back of the digital still camera 10.

Also, it is possible to produce image data having the chrominance signal C and modified luminance signal Y4 always irrespective of the object distance. In addition, a far distance mode button can be disposed on the outside of the digital still camera 10 for selecting a far distance mode in producing image data having the chrominance signal C and modified luminance signal Y4. The CPU 24 controls for focus adjustment to focus the lens system 13 at infinity.

In the present embodiment, the condition for producing image data in combination of the chrominance signal C and modified luminance signal Y4 is the state of infinity for the object distance. However, it is possible to predetermine the condition for the state of the object distance equal to or more than a limit distance, for example equal to or more than 10 meters. If the lens system 13 is a zoom lens, image data with a chrominance signal C and modified luminance signal Y4 can be produced in response to shifting of the zoom lens to a predetermined zoom position, for example a zoom position determined by shifting toward a wide end position from a center position between the wide end position and a telephoto end position.

The autofocus control of the digital still camera 10 is the TTL contrast autofocus control. However, other control methods of focusing can be used, such as a passive autofocus control, active autofocus control and the like in which the focus is adjusted according to a phase of a recorded image. Note that other photometric elements may be used, for example, an external light type of light meter having a photo receptor disposed outside the digital still camera 10.

In the above embodiment, the aperture stop and exposure time of the second mechanical shutter 16 for the infrared component 42 are controlled at values equal to those of the first mechanical shutter 15 for the visible light component 40. However, it is likely that an exposure level is not equal between images of the visible light component 40 and the infrared component 42 even for an object of the same brightness. Therefore, an AE evaluator may be incorporated in the monochromatic signal processor 20, measure object brightness of the infrared component 42, to control the aperture stop and exposure time of the second mechanical shutter 16 for the infrared component 42. Also, it is possible to use a type with higher sensitivity for the infrared image sensor 12 than that of the visible light image sensor 11 so as to set an equal exposure level.

It is likely that an exposure level of an image of the infrared component 42 is lower than that of an image of the visible light component 40. It is possible to predetermine a correction value for setting exposure of a monochromatic image signal at an exposure level equal to that of a color image signal according to the object brightness obtained by the AE control of the color image pickup. A gain value for the monochromatic image pickup can be adjusted by the AGC circuit 33 according to the correction value.

Also, an exposure time of the second mechanical shutter 16 for the infrared component 42 can be different from that of the first mechanical shutter 15 for the visible light component 40. Specifically, an exposure time of the second mechanical shutter 16 for the infrared component 42 can be set longer than that of the first mechanical shutter 15 for the visible light component 40. It is preferable in view of simplicity to predetermine a correction value for the exposure time of the second mechanical shutter 16 for the infrared component 42 in relation to the exposure time of the first mechanical shutter 15 for the visible light component 40. Both of the two images can be retrieved at a suitable exposure level by equally setting an aperture stop diameter.

Figure 2:
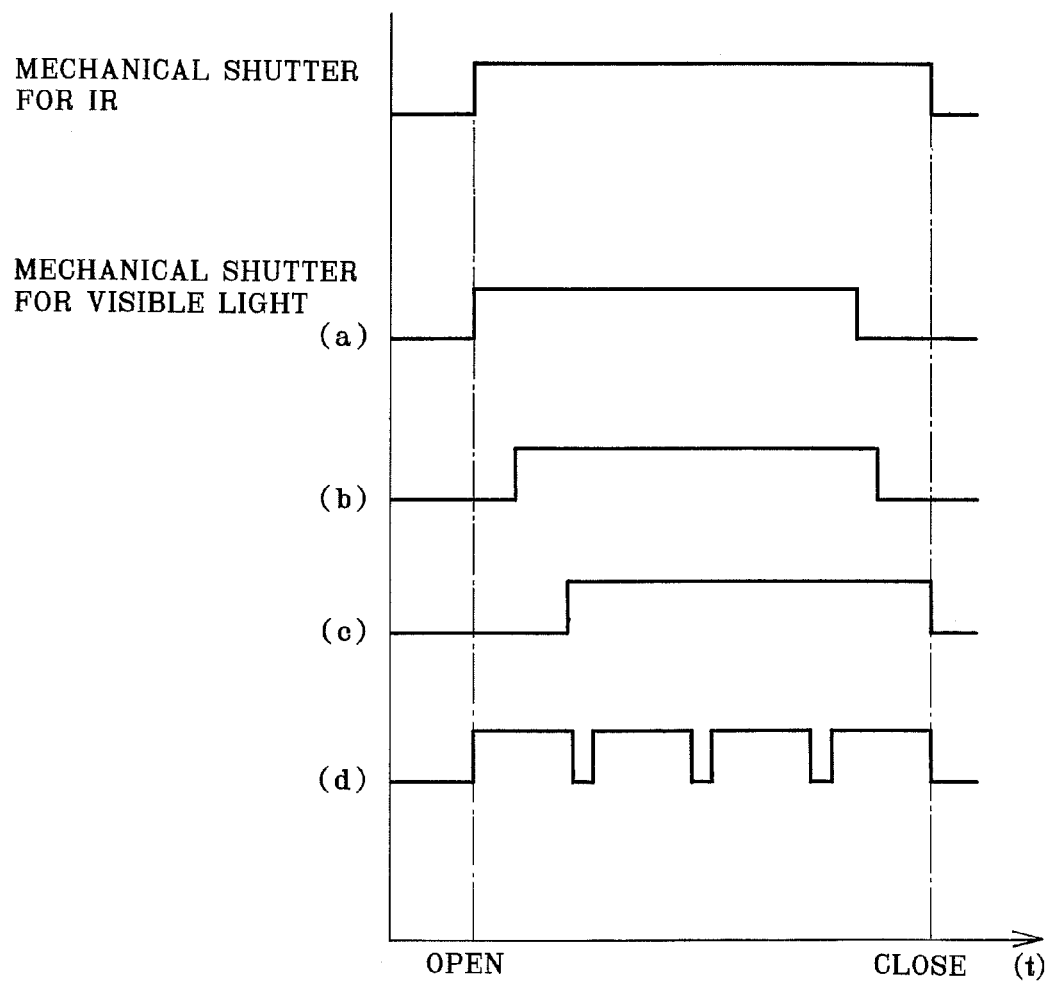
FIG. 2 is a graph illustrating opening and closing movement of mechanical shutters.

Furthermore, it is possible to control exposure time of the first mechanical shutter 15 for the visible light component 40 to be shorter than exposure time of the second mechanical shutter 16 for the infrared component 42. In FIG. 2, four examples are illustrated and indicated by lines (a), (b), (c) and (d). In FIG. 2, the line (a) expresses an example in which the first mechanical shutter 15 of the visible light component 40 initially opens at the same time as the second mechanical shutter 16 of the infrared component 42, and closes earlier than the second mechanical shutter 16. In FIG. 2, the line (b) expresses an example in which the first mechanical shutter 15 initially opens later than the second mechanical shutter 16, and closes earlier than the second mechanical shutter 16. The line (c) expresses an example in which the first mechanical shutter 15 initially opens later than the second mechanical shutter 16, and closes at the same time as the second mechanical shutter 16. The line (d) expresses an example in which the first mechanical shutter 15 opens and closes for four times while the second mechanical shutter 16 opens and closes for one time. Note that on the line (d), the first mechanical shutter 15 initially opens at the same time as the second mechanical shutter 16 of the infrared component 42. The first mechanical shutter 15 finally closes at the same time as the second mechanical shutter 16. A length of the duration of each of the four times of opening is equal in the first mechanical shutter 15.

Note that an object may move finely after setting the exposure time differently between the first and second mechanical shutters 15 and 16. This movement results in a difference in the position of the image of the visible light component 40 relative to that of the infrared component 42. The difference in the position is the most remarkable in the example of the lines (a), (b) and (c) of FIG. 2. Therefore, the example of the line (d) is the most preferable, because the difference in the position is the smallest.

In the above embodiment, axial chromatic aberration and lateral chromatic aberration are likely to occur, the axial chromatic aberration being a difference of the focal point on the optical axis, the lateral chromatic aberration being a difference in the magnification at corner portions of an image frame due to a difference of a wavelength. The axial chromatic aberration results in blur in the color. The lateral chromatic aberration results in a shift of color at the corner portions of the image frame (where a line is colored incidentally). To solve such problems, it is preferable to use the lens system 13 including lens elements of optical glass which are different in the refractive index and the dispersion. The chromatic aberration can be compensated for in a wider region of the wavelength than the visible light region. Furthermore, a compensation circuit may be incorporated in the monochromatic signal processor 20, and compensate for the chromatic aberration electrically.

A camera according to the invention can be a motion picture camera or video camera in place of the digital still camera 10.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image pickup apparatus comprising:
a lens system;
an optical separator for separating object light passed through said lens system into a visible light component and an infrared component;
a visible light image sensor for outputting a first image signal of a visible light image by receiving said visible light component;
an infrared image sensor for outputting a second image signal of an infrared image by receiving said infrared component;
a contour signal generator for producing an edge enhancement signal from a high frequency component according to said second image signal; and
an adder for adding said edge enhancement signal to a luminance signal determined according to said first image signal for edge enhancement, wherein said edge enhancement is carried out while said lens system is focused at infinity.

2. An image pickup apparatus comprising:
a lens system;
an optical separator for separating object light passed through said lens system into a visible light component and an infrared component;
a visible light image sensor for outputting a first image signal of a visible light image by receiving said visible light component;
an infrared image sensor for outputting a second image signal of an infrared image by receiving said infrared component;
a contour signal generator for producing an edge enhancement signal from a high frequency component according to said second image signal; and
an adder for adding said edge enhancement signal to a luminance signal determined according to said first image signal for edge enhancement, wherein a path length from said optical separator to said infrared image sensor is set greater than a path length from said optical separator to said visible light image sensor, to compensate for a difference in an in-focus position due to a difference between wavelengths in said object light.

3. An image pickup apparatus comprising:
a lens system;
an optical separator for separating object light passed through said lens system into a visible light component and an infrared component;
a visible light image sensor for outputting a first image signal of a visible light image by receiving said visible light component;
an infrared image sensor for outputting a second image signal of an infrared image by receiving said infrared component;
a contour signal generator for producing an edge enhancement signal from a high frequency component according to said second image signal; and
an adder for adding said edge enhancement signal to a luminance signal determined according to said first image signal for edge enhancement, further comprising a mode selector for setting a selected one of an edge enhancement mode and a normal photographing mode; wherein said edge enhancement is carried out when said edge enhancement mode is set, and is not carried out when said normal photographing mode is set.

4. An image pickup apparatus as defined in claim 3, wherein said mode selector sets said edge enhancement mode when said lens system is focused on said object at a far distance, and sets said normal photographing mode when said lens system is focused on an object at a distance smaller than said far distance.

5. An image pickup apparatus comprising:
a lens system;
an optical separator for separating object light passed through said lens system into a visible light component and an infrared component;

a visible light image sensor for outputting a first image signal of a visible light image by receiving said visible light component;

an infrared image sensor for outputting a second image signal of an infrared image by receiving said infrared component;

a contour signal generator for producing an edge enhancement signal from a high frequency component according to said second image signal; and an adder for adding said edge enhancement signal to a luminance signal determined according to said first image signal for edge enhancement, further comprising:

a first mechanical shutter disposed in front of said visible light image sensor;

a second mechanical shutter disposed in front of said infrared image sensor;

a shutter controller for controlling opening and closing of said first and second mechanical shutters to adjust exposure time of said visible light image sensor and said infrared image sensor.

6. An image pickup apparatus as defined in claim 5, wherein said shutter controller determines a first exposure time for said first mechanical shutter by adjustment, and determines a second exposure time for said second mechanical shutter by adjustment, said first exposure time is obtained according to object brightness information derived from said first image signal, and said second exposure time is obtained by adding a predetermined correction time to said first exposure time.

7. An image pickup apparatus as defined in claim 6, wherein said second mechanical shutter becomes open earlier or becomes closed later than said first mechanical shutter.

8. An image pickup apparatus as defined in claim 6, wherein said first mechanical shutter is opened and closed for plural times while said second mechanical shutter is open.

9. An image pickup method comprising steps of:

separating object light passed through a lens system into a visible light component and an infrared component;

outputting a first image signal of a visible light image by receiving said visible light component on a visible light image sensor;

in synchronism with reception of said visible light component, outputting a second image signal of an infrared image by receiving said infrared component on an infrared image sensor;

extracting a high frequency component according to said second image signal, to produce an edge enhancement signal; and adding said edge enhancement signal to a luminance signal determined according to said first image signal, further comprising a step of determining a first exposure time for said visible light image sensor by adjustment, and a second exposure time for said infrared image sensor by adjustment, wherein said first exposure time is obtained according to object brightness information derived from said first image signal, and said second exposure time is obtained by adding a predetermined correction time to said first exposure time.

* * * * *